US010860975B2

(12) United States Patent
Paul et al.

(10) Patent No.: US 10,860,975 B2
(45) Date of Patent: Dec. 8, 2020

(54) SYSTEM FOR OPTIMIZING COLLECTION AND/OR DELIVERY TRIPS

(75) Inventors: Boris Paul, Bonn (DE); Verena Wild, Bonn (DE); Thomas Schulte-Hillen, Bonn (DE); Keith Ulrich, Bonn-Oberkassel (DE)

(73) Assignee: DEUTSCHE POST AG, Bonn (DE)

(*) Notice: Subject to any disclaimer, the term of this patent is extended or adjusted under 35 U.S.C. 154(b) by 564 days.

(21) Appl. No.: 13/702,869

(22) PCT Filed: May 25, 2011

(86) PCT No.: PCT/EP2011/058559
§ 371 (c)(1), (2), (4) Date: Dec. 7, 2012

(87) PCT Pub. No.: WO2011/154256
PCT Pub. Date: Dec. 15, 2011

(65) Prior Publication Data

US 2013/0080347 A1 Mar. 28, 2013

(30) Foreign Application Priority Data

Jun. 8, 2010 (EP) .................................... 10165227

(51) Int. Cl.
*G06Q 10/08* (2012.01)
*G01C 21/34* (2006.01)
*G01C 21/36* (2006.01)

(52) U.S. Cl.
CPC ... *G06Q 10/08355* (2013.01); *G01C 21/3407* (2013.01); *G01C 21/3697* (2013.01); *G06Q 10/08* (2013.01)

(58) Field of Classification Search
CPC . G01S 13/931; G01S 2013/936; G02B 27/01; G02B 2027/014; G02B 2027/0123;
(Continued)

(56) References Cited

U.S. PATENT DOCUMENTS 7,647,231 B2 1/2010 Kuebert et al.
2002/0165729 A1 11/2002 Kuebert et al.
(Continued)

FOREIGN PATENT DOCUMENTS

WO WO2009080066 A1 7/2009
WO WO2010006726 A1 1/2010
WO 2010/040400 A1 4/2010

OTHER PUBLICATIONS

Goldberg, D. W. (2010). Spatial approaches to reducing error in geocoded data (3403568). Available from ProQuest Dissertations and Theses Professional. (366318861). Retrieved from https://dialog.proquest.com/professional/docview/366318861?accountid=131444 (Year: 2010).*

(Continued)

*Primary Examiner* — Michael P Harrington
(74) *Attorney, Agent, or Firm* — International IP Law Group, PLLC

(57) ABSTRACT

The subject innovation relates to a system for optimizing collection trips and/or delivery trips of a courier service, comprising a computer system with a database for storing address data records and for providing the address data records for a navigation system which can at least be read in at least one of the courier vehicles belonging to the courier service, has a display screen for navigation information and comprises an input system in the courier vehicle, which input system is connected to the computer system and is intended for the input of at least one item of additional information relating to at least one address data record, wherein the computer system is suitable for inserting the additional information into the stored address data records. The subject innovation also relates to a method for using this system.

14 Claims, 3 Drawing Sheets

4 5 Z1 Z2 Z3 M M1 M2 A 41 42 43 AD K N

(58) Field of Classification Search
CPC ............. G06F 3/0488; G06F 17/30241; G06F 17/3087; G06F 3/048; G06Q 10/103; G06Q 10/107; G06Q 10/06; G06Q 10/083; G06Q 10/087; G06Q 50/30; G06Q 10/0833; G06Q 10/08355; G06Q 10/08; G06Q 10/0838; G06Q 50/28; B60R 1/00; B60R 2300/205; B60R 2300/03; G01C 21/3644; G08G 1/20
See application file for complete search history.

(56) References Cited

U.S. PATENT DOCUMENTS

| | | | | |
|---|---|---|---|---|
| 2005/0004705 | A1* | 1/2005 | Stringham et al. | 700/223 |
| 2006/0235739 | A1* | 10/2006 | Levis et al. | 705/9 |
| 2008/0255758 | A1* | 10/2008 | Graham | G08G 1/20<br>701/469 |
| 2009/0309709 | A1* | 12/2009 | Bevacqua et al. | 340/426.18 |
| 2010/0082242 | A1 | 4/2010 | Park | |
| 2011/0066369 | A1* | 3/2011 | Klassen et al. | 701/204 |

OTHER PUBLICATIONS

Weigel, D., & Cao, B. (1999). Applying GIS and OR techniques to solve sears technician-dispatching and home-delivery problems. Interfaces, 29(1), 112-130. Retrieved from https://search.proquest.com/docview/217126117?accountid=14753 (Year: 1999).*

PCT International Preliminary Report on Patentability, dated Jun. 8, 2010, with International Search Report, German.

Extended European Search Report, dated Feb. 5, 2018, German.

* cited by examiner

SYSTEM FOR OPTIMIZING COLLECTION AND/OR DELIVERY TRIPS

CROSS-REFERENCE TO RELATED APPLICATIONS

Pursuant to 35 U.S.C. § 371, this application is the United States National Stage Application of International Patent Application No. PCT/EP2011/058559, filed on May 25, 2011, the contents of which are incorporated by reference as if set forth in their entirety herein, which claims priority to European (EP) Patent Application No. 10165227.9, filed Jun. 8, 2010, the contents of which are incorporated by reference as if set forth in their entirety herein.

BACKGROUND

Courier services delivering or collecting goods use collection or delivery addresses to plan courier journeys involving multiple destinations as optimally as possible, i.e. with as little expenditure of time or materials as possible. U.S. Pat. No. 7,647,231 discloses a system for delivery of pieces of mail, in which the stopping sequence of the transport to the addressees and other recipients can be switched and the address of these can be flexibly changed during the transport. The delivery journey adapts according to the changes made. All these systems suffer, to some extent, from an address data record that can be incomplete, inexact or incorrect. For example, the position of an address (house number) for navigation systems based on geo-coordinates that are allocated to the addresses deviates, in some cases by up to 100 m, from the actual position of said address. In other cases, multiple house numbers in a street are displayed as a common site (common geo-coordinate) which renders finding the actual position of one of said house numbers more difficult. In some cases, geo-coordinates for individual house numbers in some streets for the navigation system are not available at all. Instead, the corresponding street addresses are displayed at the mid-point of said street, which is more than 100 m away from the actual destination address in some cases. Mis-guidance during the delivery and/or collection of pieces of mail using a navigation system due to incorrect, inexact or incomplete data leads to significant loss of time during the collection at and/or delivery to customer addresses, in particular during courier journeys involving a large number of destinations to approach.

SUMMARY

The subject innovation relates to a system for optimizing collection and/or delivery journeys and a method for application of said system.

The subject innovation may provide a system that allows collection and/or delivery journeys to be optimized. The subject innovation may also provide a method for operating a system of said type.

A system for optimizing collection journeys and/or delivery journeys of a courier service may comprise a computer system with a database for storing address data records and for providing the address data records for a navigation system which can at least be read in at least one of the courier vehicles of the courier service, has a display screen for navigation information and an input system, which input system is connected to the computer system and is intended for entering at least one additional information on at least one address data record, whereby the computer system is suitable for inserting the additional information into the stored address data records.

Collection and/or delivery journeys include all types of journeys, in which a consignment is either delivered to a recipient or a consignment is collected from a dispatcher. Recipients and dispatchers in this context can be either the final dispatchers and/or recipients or can be the dispatchers and/or recipients of the consignment at an interim station along the delivery chain of a consignment. A logistics center for distribution of consignments, for example, is both recipient and dispatcher in the scope of the subject innovation. In the scope of the subject innovation, the term, “optimization”, shall be understood to mean improvement as compared to other existing systems, i.e. a system that enables more rapid, simpler or more effective collection/delivery of consignments. The system claimed in the subject innovation is a learning system since inputs can be made. Courier services in this context can be any kind of courier services, e.g. DHL or other courier services. Courier vehicles can be vehicles of any kind, and usually will be vans or trucks. In alternative embodiments, the courier vehicles can be bicycles just as well. The consignments transported by the collection and/or delivery journeys can be objects of any type, for example packages, letters, containers or other objects.

The address data records comprise at least one or more address data for a certain address, such as name of person/company, street name, house number, postal code and/or city as well as the geo-coordinates belonging to the thus defined position, on the basis of which the navigation system is to guide the driver of the courier vehicle to the destination address. The navigation system that is readable in the courier vehicle characterizes the need to be able to read the navigation information the navigation system provides to the driver on a suitable display screen in the courier vehicle. The navigation information in this context can preferably comprise a street map, a satellite image or an image from bird’s eye view of the surroundings of a destination address with driving information (e.g. as a guide arrow overlay). The maps or aerial images can be rotated using a compass rose such that the top of the map or image shows north/west/south/east according to the selection made. Likewise, sections of the map or image can be magnified or scaled down and/or shifted using a cursor and using a finger in the case of a so-called touch-screen serving as display screen. Street maps in combination with aerial images (satellite or bird’s eye view), preferably capable of being toggled, give the driver a much better impression of the local situation around a destination address than, for example, just the presentation of a guide arrow for street navigation without further information about the surroundings. For a high level of acceptance amongst courier services and courier drivers, intuitive operation of the system is important which is why the use of maps or satellite images with simple mouse operation is preferred. The navigation information can just as well be a combination of different types of information, for example including additional direction and distance information. In addition, voice information from the system can further support navigation. In one embodiment, the navigation system can be arranged in the courier vehicle and be connected to the computer system using known wireless connection pathways, for example using a mobile phone connection or a wireless LAN connection. In this context, the navigation system can either convert the address data records into destination coordinates autonomously or have the destination data needed for guidance to the destination provided to it by the computer system. The navigation system of an alternative embodiment can be installed centrally on the computer system and transmit the navigation information for the driver to a display screen by wireless transmission as described above. For both purposes, navigation software can be installed in the computer system, for example Infoware Mapsuite Server 3.0 for provision of geocoder data, maps, aerial images and/or a routing service. The computer system can be any computer system that is suitable for executing the system according to the subject innovation and for the storage and change of address data records, for example a server-based computer system. The insertion of the additional information can proceed, for example, directly in the computer system using editable address data records. For this purpose, the computer system must provide the address data records to the driver or another person authorized to enter additional information in a format that can be edited at least partly. Alternatively, the computer system could just as well comprise a separate component as input mechanism, for example a software installed therein that is suitable for inserting data into data records and, upon additional information becoming available, changes the address data records in such manner that said additional information is added to the address data records such that said additional information is provided together with previously existing information when the respective address data record is provided. This would be advantageous in that the additional information is added to the address data records in a suitable data format and incorrect data input by the drivers would be discovered and corrected, if applicable, or could not be added. The provision [of data] preferably proceeds in active manner using the display screen of the navigation system in the courier vehicle, but can just as well proceed in passive manner using an accessible address in the computer system. In the latter case, the users of the system would need to request the address data records from the computer system.

The input system of the subject innovation for entering additional information supplementing the existing address data records enables the system, firstly, to collect empirical values made by drivers during the delivery and/or collection of consignments at certain addresses, and, secondly, can provide these to other drivers based on the changed or expanded address data records for improved courier service performance at a later time. The additional information in this context can be entered into the system directly by the driver of the courier vehicle or by any other authorized person. For this purpose, the input system of one embodiment can be installed in the courier vehicle. In another embodiment, the system comprises input systems outside of the courier vehicles for input of the additional information. One example of an authorized person who is not the driver of the courier vehicle would be the expediter of the courier job who is advised by phone of the empirical values made by the driver of the courier vehicle and then enters said empirical values into the system. In an alternative embodiment, the empirical values made can just as well be transmitted to one or more input persons in charge and can be entered into the system as additional information by said person. The additional information can, for example, consist of a favorable approach point (and its geo-coordinates) defined by a driver if the position information of the destination address according to the navigation system deviates from the actual position of said address. Said empirical values can only be obtained locally by the drivers of the courier vehicles. Other empirical values of drivers in this context can be information concerning the accessibility of a delivery/collection address from a certain side of the building or for certain types of courier vehicles, e.g. “truck access from the front of the building only, small vehicle or bicycles have access from the back as well”. Other empirical values can, for example, concern the availability of staff for acceptance or dispatch of consignments, e.g. “if the gatekeeper is not present at the main gate, the consignment can also be handed over at a side entrance”. Empirical values can just as well concern possible useful combinations of delivery addresses, e.g. “addresses A, B, and C can be served from a common approach point X, since there is a common house entrance/passageway”. The examples above are mentioned for exemplary purposes only. Any other type of empirical value of a courier driver (e.g. opening times, etc.) can be valuable additional information which, if available in combination with the address information as address data record, renders the subsequent courier journeys to said certain address more effective and more successful. This feedback option for courier drivers in the system according to the subject innovation enables a system for optimizing collection and/or delivery journeys in which the full efficiency potential from the empirical values of the drivers being integrated into the system is utilized. Moreover, drivers having the opportunity to enter additional information produces a high acceptance level amongst drivers with regard to the effective utilization of the system. The improved database of address data records also renders the courier service markedly more efficient in the long-term. The input system can comprise any suitable type of input mechanism. A simple input mechanism could, for example, be a button to be actuated that is being pressed upon arrival at an approach point of a delivery address and transmits the current geo-coordinates to the system, which can then be added to the address data records by the input mechanism. The thus recorded approach point is presented as most favorable approach point for the allocated address when subsequent courier drivers have to approach said address again. In other embodiments, the input mechanism can, for example, just as well be a computer keyboard with a control monitor.

In one embodiment, the computer system is a web-based computer system. In this context, a web-based computer system is a computer system whose programs (web application) are executed on a web server, whereby an interaction with the user can proceed using a web browser. For this purpose, the access device of the user (client) and the computer system of the service provider (server) are connected to each other by a network like the internet or an intranet such that the spatial distance between client and server is insignificant. The user starts a web application, e.g. by entering the URL of the web server in a browser, and thus sends the first request (HTTP request). The web server receives said request and transmits it to a program, which then generates or loads the HTML source code of a website which the web server returns to the user’s browser (HTTP response). Said website is the graphical user interface of the web application for the system according to the subject innovation. Web applications do not necessitate the use of a browser. Rather, requests can also be made by other programs processing the response of the web server, e.g. the operation of a navigation system according to the subject innovation in the courier vehicle.

The advantage of web applications is that the user needs to have access to a web browser as the only prerequisite, which usually exists already on most computer systems. Accordingly, in contrast to conventional client-server applications, no installation of further software on the computers of the users is required except for browser plug-ins such as Flash. This allows web applications to achieve a high degree of platform independence as long as it was made sure during their development that all browsers are supported. If the logics of a web application need to be changed, changes are required at a single (central) site only, namely on the web server, which has a favorable effect on maintenance costs. The ever-increasing spread of browsers to other end-devices, such as mobile phones or PDAs, allows web applications to spread quickly beyond classical software environments. The following applications/programs, for example, can be used as server-side infrastructure for the system according to the subject innovation: Java 1.5, Apache Tomcat from 5.5.x, SOAP Web services with Apache Axis2/Java version 1.4, SOAP 1.1 (http Protocol binding without attachments), WSDL 1.1 (SOAP binding), infoware mapsuite Server 3.0 (Geocoder server, map server for maps and aerial images, routing server), infoware MapAPI 1.0, infoware editing system (JSP, Java) or ODARS-Tools. A SQL database (like, e.g., Postgres), for example, can be used as database. Aside from the applications/programs specified above, a person skilled in the art can select other infrastructure solutions for the system according to the subject innovation within the scope of the present subject innovation.

In an embodiment of the web-based computer system, the computer system comprises one or more servers suitable for access by a multitude of different users, whereby the computer system comprises a rights administration which makes only certain address data records available to the user based on the rights of said user. Said rights administration distributes and/or administers access rights of the users which define which parts of the computer system are accessible to said user and which are specifically blocked for said user. In electronic data processing, access rights mechanism the rules of administrative access control (rights administration) on which the decision whether or not and in which way users are authorized to execute programs or parts of programs, operations on objects (e.g. networks, data systems) is based. Said access rights can vary between different users. Access rights can be granted to the respective user based on a table deposited in the computer system after entering a user name and a password.

Access control lists are one option of designing access rights very flexibly as they specify for each user (user role) or each group which access is permitted and which is not. Some programming languages have their own operating system-independent security system that is integrated into the runtime environment. Pertinent examples include the security concepts of Java and .NET. The access rights are usually not dependent on the user in this context, but rather on the extent to which a certain program library is considered trustworthy. For assessment of the security of computer systems, the security systems for the administration of access rights are sub-divided in two classes:

Discretionary access control: access is granted or denied based on the identity of the player (user).

Mandatory access control or multilateral security models: access is granted or denied based on general rules and properties.

Model and administration of access rights is an important component of secure computer systems and thus a criterion of the certification in accordance with customary security standards, such as TCSEC and ITSEC.

In a preferred embodiment, the rights administration is suitable for granting or denying the user to enter additional information for the certain address records. Limiting the input options as described can ensure the uniformity of the data in the address data records and prevent, if applicable, inexperienced users from inadvertently changing or deleting possibly relevant additional information.

In a further embodiment, the input system comprises input mechanism with at least one editable field for input of the additional information. In this context, the term, "editable", refers to the option to enter and/or change data using or in an input window or using another application program. In this context, the input window is also suitable for viewing the original, entered or changed data. This allows additional information to be entered easily, for example as free text, and allows the person making the entry to monitor if the information is entered correctly in the input window. The input mechanism can be arranged separately from the display screen of the navigation system. In an advantageous embodiment, the input mechanism is integrated into the display screen of the navigation system. In this context, the input mechanism can be arranged in a separate window or section of the display screen. In an advantageous embodiment, the input mechanism is a semi-transparent overlay over the navigation information on the display screen. Accordingly, the driver entering the additional information is not forced to change his direction of view during input of the additional information. Moreover, having the overlay forces the driver to focus on the input made since there is no distraction by concurrent navigation information.

In an advantageous embodiment, the additional information further comprises at least one element from the group of synonyms and abbreviations of the recipients, times of availability, additional specifications and/or advice for subsequent courier journeys, changes of approach point, approach information, courier identification or date specifications related to an address. The broader the database of address data records, the closer to optimal the driver of the courier vehicle can approach the approach point of a certain address.

In a further embodiment, the navigation system comprises a display element in the courier vehicle for display of address data records including the additional information. Accordingly, the functional capacity of the navigation device with an existing screen for presentation of the navigation information is concurrently utilized for display of the additional information of the address data records and an additional device for display of the additional information is made dispensable. The geo-coordinates of the delivery and/or collection address in the address data records can be converted into a journey route directly by the navigation system. However, the additional information needs to be displayed, since they need to be read by the driver provided such information is textual information. In an advantageous embodiment, the display element is integrated into the display screen of the navigation system and thus is always visible and easy to read for the driver during courier journeys. Said integration into the display screen can be implemented as a separate window or as a window overlay. In a more advantageous embodiment, the display element is semitransparent and overlayed over the navigation information on the display screen. This renders the handling, in particular the reading of additional information even easier for the driver. In an alternative embodiment, the additional information can be provided to the driver fully or partly using a loudspeaker in the display screen of the navigation device as voice announcements.

The subject innovation further relates to a method for optimizing collection journeys and/or delivery journeys with a system according to the subject innovation, comprising the steps of storing address data records in a database of a computer system, making available the address data records using a navigation system having a display screen for navigation information that can be read in at least one of the courier vehicles of the courier service, input of at least one piece of additional information on at least one address data record using an input system that is connected to the computer system, and inserting the additional information into the stored address data records using the computer system that is suitable for this purpose.

In this context, the input system can be arranged in the courier vehicle for input by the driver of the courier vehicle and/or at other locations, for example at the premises of the expediter of the courier journeys who is, for example, advised of the empirical values by the drivers over the phone and then enters said empirical values into the system.

In an embodiment of the method, the step of providing the address data records comprises the additional step of calling-up the system as web-based system by a user of the system using an access portal on the internet.

In a preferred embodiment, calling-up the system comprising entering identity information of the user. Identity information can, for example, be the user name and a password. In a further preferred embodiment having a rights administration in the system, the step of providing address data records is limited to certain address data records as a function of the rights of the user, preferably the step of entering additional information is also limited to certain additional information as a function of the rights of the user. The limitation of access rights can be controlled and managed using tables of users and their access rights deposited [in the system].

In another embodiment of the method, the step of entering proceeds using editable fields for input of additional information, preferably additional information comprising synonyms and abbreviations of the recipients, times of availability, additional specifications and/or advice for subsequent courier journeys, changes of approach point, approach information, courier identification or date specifications related to an address.

DETAILED DESCRIPTION OF SPECIFIC EMBODIMENTS

Figure 1:
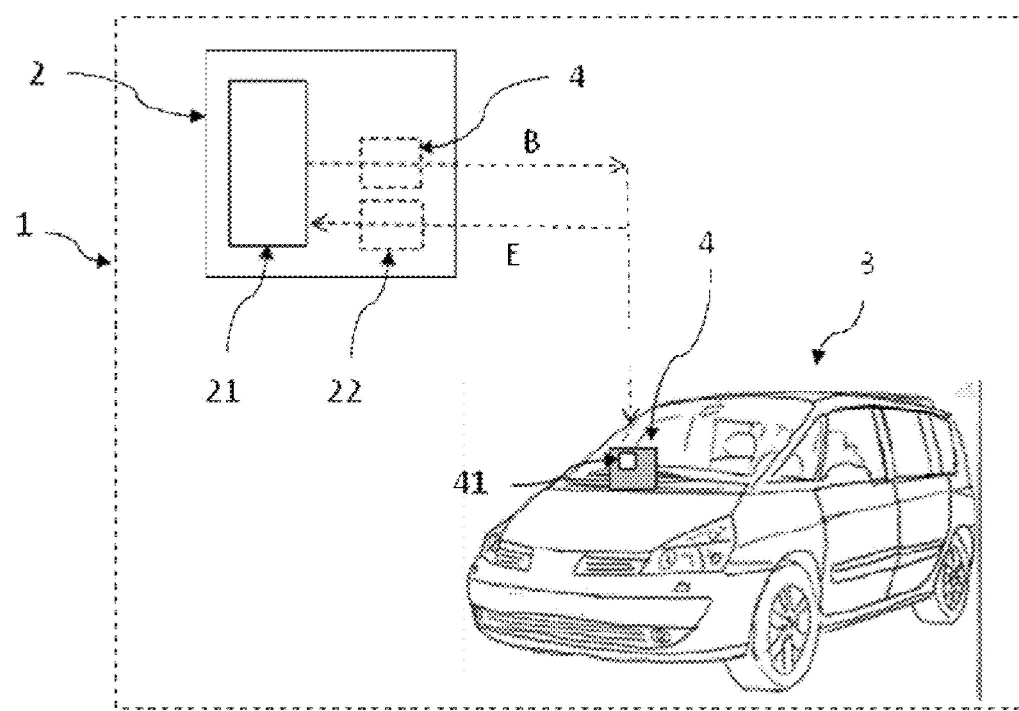
FIG. 1 shows an embodiment of the system according to the subject innovation.

FIG. 1 shows an embodiment of the system 1 for optimizing collection journeys and/or delivery journeys of a courier service, comprising a computer system 2 having a database 21, e.g. an SQL-DB database, for storing address data records and for providing B the address data records (shown schematically as a dashed arrow pointing towards the courier vehicle) for a navigation system 4 that can at least be read in at least one of the courier vehicles 3 of the courier service, has a display screen 41 for navigation information and an input system 42 for entering at least one additional information on at least one address data record. The navigation system 4 can be installed right in the courier vehicle 3 or, alternatively, in computer system 2 (indicated by the dashed box identified by reference number 4). In the former case, the address data records are transmitted by wireless mechanism to the navigation system 4 in the courier vehicle where they are processed to generate a journey route. In the latter case, the journey route and the additional specifications are transmitted by wireless mechanism from the computer system 2 to the display screen 41 in the courier vehicle 3 and thus are provided B. Moreover, the additional information entered in the courier vehicle 3 is transmitted to the computer system 2 and inserted into the stored address data records E. The insertion E (shown schematically as dashed arrow pointing towards the computer system) can either be effected in editable address data records right by the driver of the courier vehicle or the insertion in the stored address data records can be effected using an additional component (insertion mechanism 22 shown dashed), whereby said component is arranged in this case, for example, in the computer system 2. The courier vehicle 3 shown in FIG. 1 is just an example of a courier vehicle. The system according to the subject innovation can be used with courier vehicles of all types, e.g. bicycles.

A possible format of the address data records is shown in Table 1, in which each address data record consists, for example, of street name (Str.), house number (HsNr), postal code (PLZ), city, date of most recent revision of the address data record, information regarding the presence (yes/no) of time windows (e.g. concerning the availability of addressees), and other additional information (Comments yes/no). Preferably, said address data records can be called up and displayed by administration software. In this context, the addresses can be displayed sorted in alphabetical order. The sorting can be changed in the administration software using a mouse click. In other embodiments, the address data records can also contain other or additional information, such as company name in the case of business addresses, phone numbers, fax numbers, etc.

Figure 2:
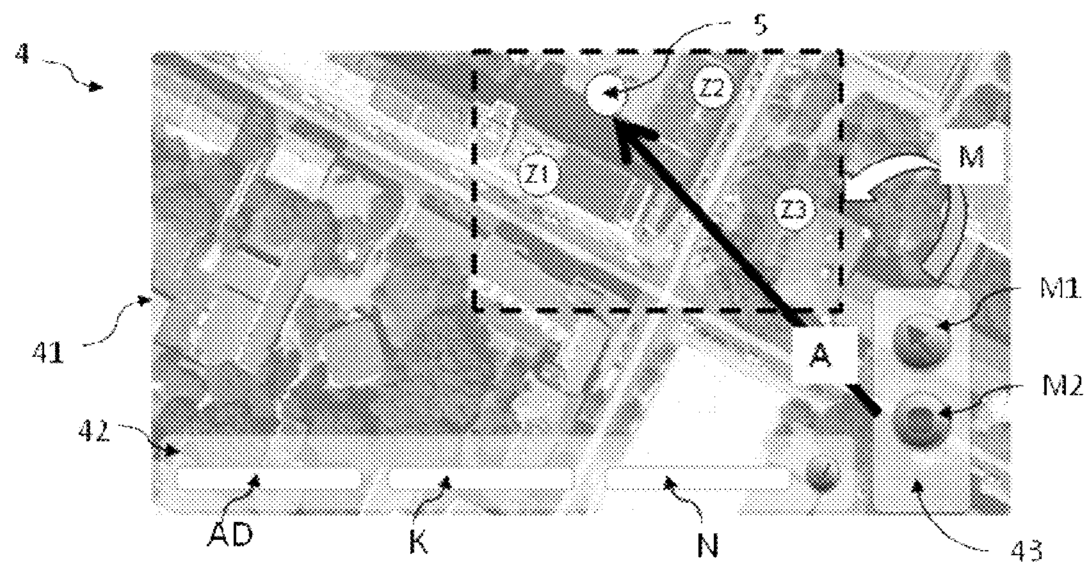
FIG. 2 shows an embodiment of the input of additional information.
Figure 3:
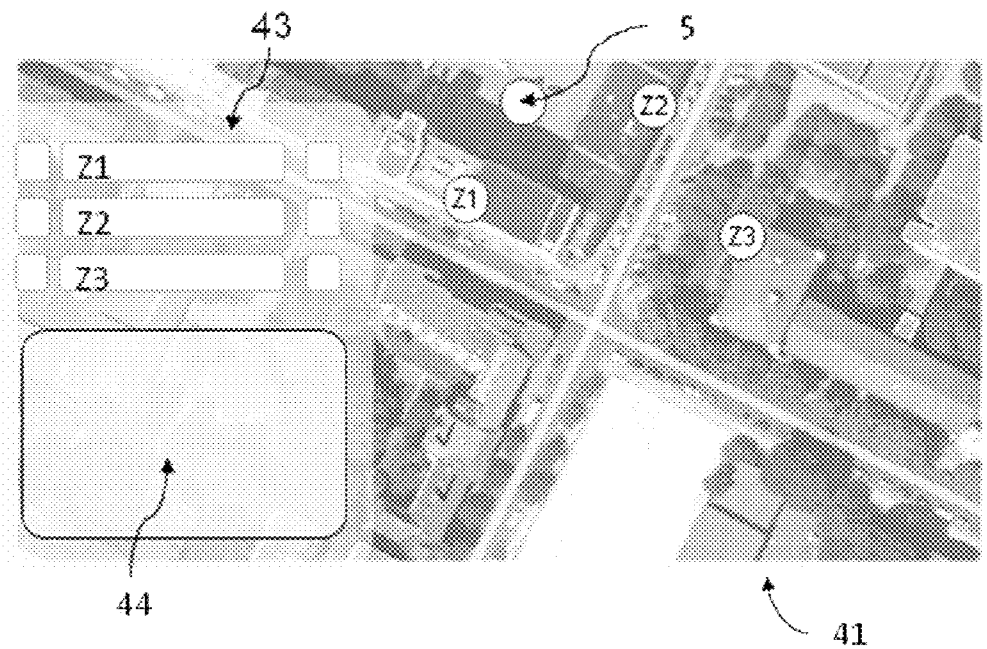
FIG. 3 shows a further embodiment of the input of additional information.

FIGS. 2 and 3 show embodiments of a display screen 41 of the navigation device 4, in which an street detail is shown as a satellite image (satellite view) as navigation information. The input system 42 in this case is arranged as an overlay and partly semi-transparent in the display screen 41 of the navigation system 4. Upon entering, for example, an address AD, a customer name K or a job number N, a corresponding area around destination address Z1 that corresponds to the address data entered is displayed. Upon entering address data for which multiple address data records exist (e.g. ambiguous address or ambiguous name), the system can present the addresses found for the respective information in a list to allow appropriate selection of the desired address. In a further embodiment, the system can offer an expanded search, for example for a destination address, using input fields, such as postal code, street, city, name (company name, private) or first name, for example of the person to receive the delivery. Other or additional search details can be used in the expanded search just as well. In a preferred embodiment, the expanded search can be linked to a database of synonyms. The database of synonym contains alternative spellings or frequent typing errors. The link thus generated allows the search for a destination address to proceed quickly in the expanded search despite inexact or incorrect information being entered. In a further preferred embodiment, the expanded search for destination addresses accepts abbreviations of the addresses/persons. This means that a destination address related to address information/person information is found even if, for example, the input of the postal code is accompanied only by the abbreviated name entered in the search details. After display of the surroundings for a destination address Z1, a cursor M1 can be used, as shown in FIG. 2, to mark a selection area M around the destination address. A cursor (or insertion marker, writing marker, input marker) marks a place on the screen at which or to which input is to be added. Said cursor is often displayed as a small arrow. The mouse pointer on the desktop which is being moved and used using a pointing device is also called cursor. In the case of touch-screens, the cursor is often not visible. The contact point of the finger or pointing pen is then called cursor focus. In an embodiment, the system according to the subject innovation can display in the marked area all further destination addresses Z2, Z3 with regard to which either address data records exist and/or which are still to be processed by the driver during the current journey. In one embodiment, the addresses that are not needed can be un-marked/removed in the map, or in a list in a different embodiment, by clicking such as is shown, for example, in FIG. 3. Once destination address Z3 was unmarked, the remaining destination addresses Z1, Z2 can be processed with regard to additional information in an editable field 44 (FIG. 3) or via a defined geo-coordinate (approach point 5, see FIGS. 2 and 3). Referring, for example, to two neighboring destination addresses, the driver can then mark a common approach point 5 for said two addresses using a cursor M2 (shown schematically by a bold black arrow A in FIG. 1). For subsequent courier journeys to one or both of said addresses, the system will then specify the defined approach point 5 as approach point to the courier drivers. In order to prevent perspective distortion while defining the approach point 5, it is advantageous to switch to a map view or a satellite image as navigation information. However, if an improved spatial presentation is needed for input of the additional information, it is advantageous to switch to the perspective view (bird's eye view). Once the approach point 5 is defined, all destination addresses Z1, Z2 in the marked area M get the geo-coordinate of approach point 5 assigned to them. The geo-coordinate of the common approach point 5 is inserted as additional information into the address data records of the corresponding destination addresses Z1, Z2. This allows sections of an area to be made available to the navigation system 4 that were not available in the original street network of navigation system 4.

Figure 4:
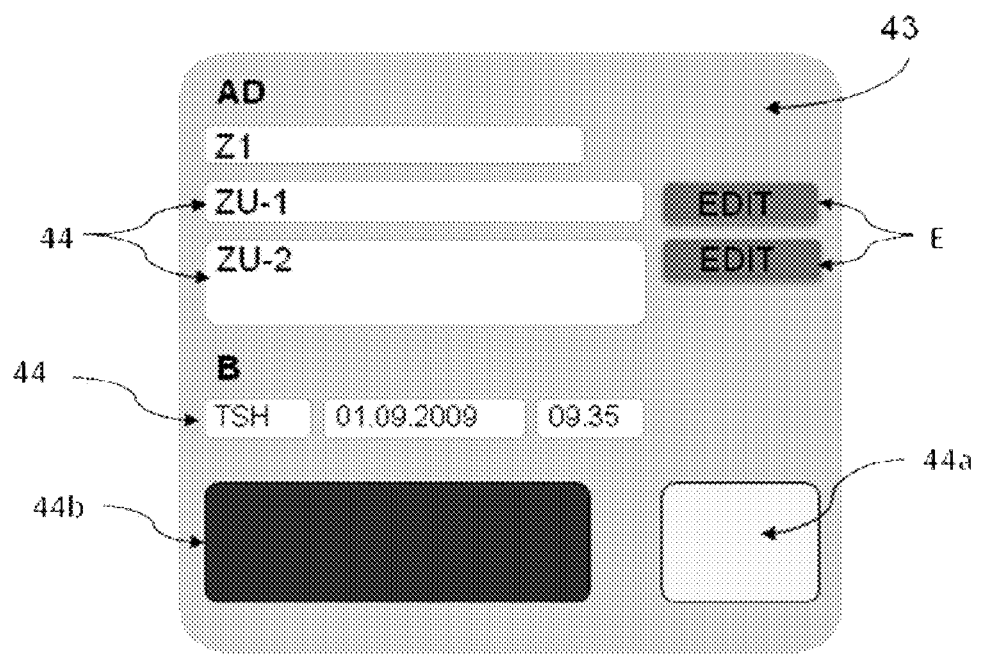
FIG. 4 shows yet a further embodiment of the input of additional information.

FIG. 4 shows a further embodiment of the input mechanism 43 in display screen 41 (not shown here). In the input mechanism 43, a destination address can be entered into a corresponding display field AD. Additional information, for example ZU-1, ZU-2, on said address with an existing address data record can be entered in editable fields 44. The additional information does not have to be limited in number to two pieces of additional information in this context. Any number of pieces of additional information can be entered successively using said fields 44. In this embodiment, an edited field E ("EDIT") needs to be confirmed before entering additional information ZU-1, ZU-2. This two-step operation serves, e.g., purposes of data security to make sure that additional information in a field is not written, overwritten or changed inadvertently and unintentionally. The person entering information can, for example, sign the input made in a user field B using the person's initials (here, e.g., TSH), date, and time of day to allow for tracing at a later time. Specifying the date and time of day can serve as an indicator of the up-to-dateness of additional information ZU-1, ZU-2 when said additional information ZU-1, ZU-2 is displayed. Additional information having an input date in the distant past may need to be treated with caution, e.g. additional information on opening times, etc. The input of additional information ZU1, ZU-2 in the input mechanism 43 is signed using a field 44*a*, if correct, before transmission to the computer system or cancelled using a field 44*b* in the case of erroneous/useless input.

The input of data (e.g. address data, additional information) can be made either with a keyboard, which is, for example, integrated into the display screen 41, or a so-called touch-screen field with letters for input of text information is displayed in the display screen 41. A touch-screen is a screen or a field on a screen that can be used to make an input or operate a program by touching it, for example with a finger.

Figure 5:
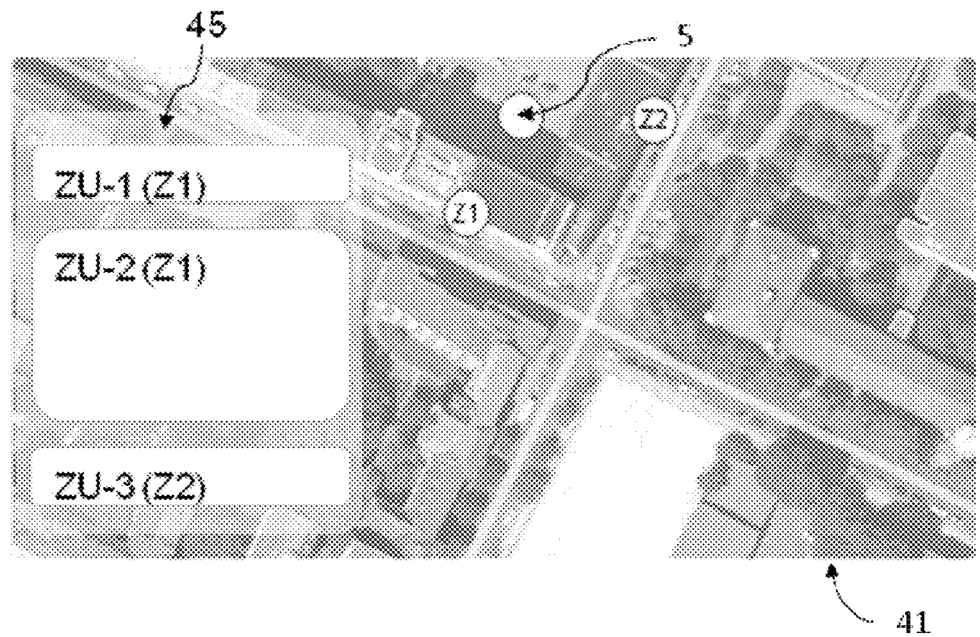
FIG. 5 shows an embodiment of the displaying of additional information.

FIG. 5 shows an embodiment of a display element 45 for address data records and/or additional information ZU-1, ZU-2, ZU-3. In this context, the display element 45 is arranged as an overlay and partially semi-transparent in the display screen 41 of the navigation system 4. The navigation information shown includes the common approach point 5 for the destination addresses Z1, Z2 and the additional information ZU-1 (for Z1), ZU-2 (for Z1), and ZU-3 (for Z2) available for said destination addresses. Additional information on destination addresses can include, for example, advice such as "Bell for Z1 is hidden behind a rosebush", "Z1 is not available before 10 o'clock", "Z1 is available only after 11 o'clock", "approach with trucks over 5 tons only from the back" or "Packages for Mr Mustermann can be handed over to the Midler family next door on the right". Time information regarding the availability of certain destination addresses Z1, Z2 can be used to improve the route planning of the courier service. For this purpose, the input mechanism 43 in FIGS. 2-4 can comprise specific time windows for input of time information ZU-1, ZU-2. Specifically specified time windows of this type can therefore also be included in the route planning of the courier service by a machine using suitable software. Other additional information, such as common approach points, are available already by the defined specification of approach points 5 and the presentation thereof as approach destination in the display screen 41 of the navigation device 4.

Figure 6:
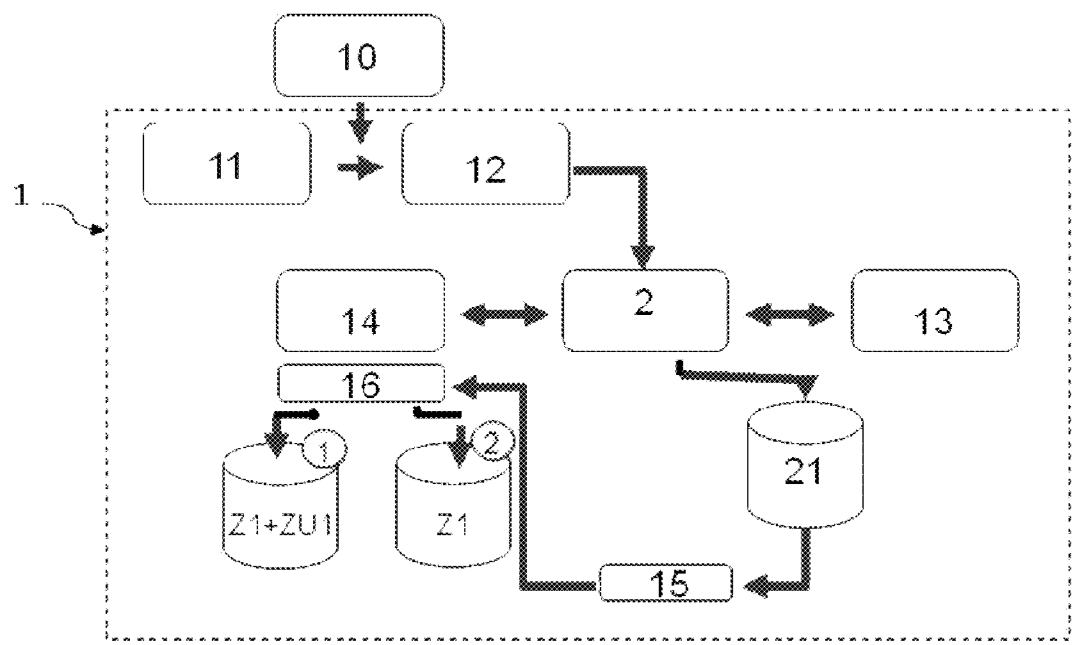
FIG. 6 shows a schematic system overview of the system according to the subject innovation.

FIG. 6 shows a schematic system overview of the system 1 according to the subject innovation. A user 10 accesses the system 1 according to the subject innovation as a web-based system. Once the user logged into a corresponding portal of the system 1 (access portal) using user name and password, the user can enter a destination address into the system. The system 1 can be multi-client-enabled, i.e. the system distinguishes the address data records by user (user administration). Each user can view only said user's own address data records. A destination address is selected using a corresponding menu 11 and processed, if applicable, using a menu 12, in which additional information, if applicable, can be entered for a specified address. The destination address being defined starts-up the web-based computer system 2. In this context, the system can use externally stored applications 13 for execution of the system, if applicable. The system accesses the address data records that are stored in a database 21 (supplemental geo-coordinates may be requested using a geocoder 14) and provides this data to the user using an export interface 15 and in accordance with suitable display device 16 (e.g. the display screen 41): (1)

destination address including additional information or (2) destination address without additional information. To be able to utilize the system 1, the user needs to have, e.g., a browser (e.g. IExplorer or FireFox) and a SOAP interface. Said interfaces are designed according to the SOAP standard for universal usability. The functions of the system 1 can just as well be used individually in modular manner. SOAP interfaces can be used conveniently with numerous programming languages. The following applications/programs, for example, can be used as server-side infrastructure for the system according to the subject innovation: Java 1.5, Apache Tomcat from 5.5.x, SOAP Web services with Apache Axis2/Java Version 1.4, SOAP 1.1 (http Protocol binding without attachments), WSDL 1.1 (SOAP binding), infoware mapsuite Server 3.0 (Geocoder server, map server for maps and aerial images, routing server), infoware MapAPI 1.0, infoware editing system (JSP, Java) or ODARS-Tools. A SQL database (like, e.g., Postgres), for example, can be used as database. The user can exit from the system by logging out.

The embodiments shown here are simply examples of the subject innovation and must not be construed such as to limit the scope of the subject innovation. Alternative embodiments considered by a person skilled in the art are also included in the range of protection of the present subject innovation.

TABLE 1

| Str. | HsNr. | PLZ | City | Date of most recent revision | Time window (yes/no) | Comment (yes/no) |
|---|---|---|---|---|---|---|
| Wrangelstr. | 100 | 10234 | Berlin | 01 Sep. 2009 | yes | yes |
| Meierstr. | 4 | 10999 | Berlin | 23 Apr. 2009 | no | yes |
| Adamstr. | 345 | 10345 | Berlin | 01 Jan. 2008 | no | no |

What is claimed is:

1. A system for optimizing collection journeys and delivery journeys of a courier service, comprising:

a computer system having a database for storing address data records and for providing the address data records for a navigation system that can at least be read in at least one of the courier vehicles of the courier service;

an input system connected to the computer system for entering at least one additional information on at least one address data record, the computer system being configured to allow insertion of the additional information into the at least one address data record;

a display screen connected to the computer system for displaying navigation information comprising at least two of a street map, a satellite image, and a perspective view of the surroundings of a destination address, the display to automatically switch to a perspective view in response to the input system being used to define an approach point; and the system being configured to use, after display of surroundings of a destination address, a cursor to mark a common approach point for the displayed destination addresses on a semi-transparent overlay over the navigation information on the display screen with a geo-coordinate of the common approach point deviating from the geo-coordinates of the destination addresses in the selection area, where for all destination addresses in a marked area, the geo-coordinate of the common approach point is inserted as additional information into address data records of each of the destination addresses as the approach destination.

2. The system recited in claim 1, the geo-coordinate of the approach point is inserted as additional information into the address data records of the corresponding destination addresses.

3. The system recited in claim 1, in which destination addresses that are not needed are unmarked or removed responsive to an input signal before marking a common approach point.

4. The system recited in claim 3, in which the computer system is a web-based computer system comprising one or more servers configured for access by a plurality of different users, the computer system comprising a rights administration which makes only certain address data records available to the user based on the rights of the user, the rights administration being configured for granting or denying the user to enter additional information for the certain address records.

5. The system recited in claim 1, the input system comprising an input mechanism with at least one editable field for input of the additional information.

6. The system recited in claim 5, the additional information further comprising at least one element from a group of synonyms and abbreviations of the recipients, times of availability, additional specifications, advice for subsequent courier journeys, changes of approach point, approach information, courier identification or date specifications related to an address.

7. The system recited in claim 1, the navigation system comprising a display element in the courier vehicle for display of address data records including the additional information.

8. A method for optimizing collection journeys and delivery journeys, comprising:

storing address data records in a database of a computer system;

making available the address data records with a navigation system having a display screen;

displaying navigation information comprising at least two of a street map, a satellite image, and a perspective view of the surroundings of a destination address;

automatically switching the display to a perspective view in response to the input system being used to define an approach point;

receiving at least one piece of additional information on at least one address data record using an input system that is connected to the computer system;

inserting the additional information into the stored address data records using the computer system;

displaying surroundings of the destination address;

marking a selection area around the destination address on the display screen using a cursor;

displaying all other destination addresses in the marked area;

marking a common approach point on a semi-transparent overlay over the navigation information that allows concurrent delivery of navigation information and area for marking the common approach point on the display screen for the displayed destination addresses using a cursor;

assigning the geo-coordinate of the common approach point deviating from the geo-coordinates of the destination addresses in the selection area to all destination addresses in the marked area in a way that, for all destination addresses in the marked area, the geo-coordinate of the common approach point is inserted as additional information into the address data records of each of the destination addresses as the approach destination; and specifying in the display screen the defined approach point for the destination addresses to courier drivers by the system.

9. The method recited in claim 8, receiving a signal to mark or remove destination addresses that are not needed before marking a common approach point.

10. The method recited in claim 9, wherein receiving the signal proceeds via editable fields for input of additional information that comprises times of availability, approach information, advice for subsequent courier journeys, courier identification or date specifications related to an address.

11. The method recited in claim 8, comprising calling-up the system as a web-based system via an access portal on the internet.

12. The method recited in claim 11, wherein calling-up the system comprises entering identity information of the user.

13. The method recited in claim 12, wherein after entry of identity information of the user, the provision of address data records is limited to certain address data records as a function of the rights of the user, preferably the step of entering additional information is also limited to certain additional information as a function of the rights of the user.

14. A system for optimizing collection journeys and delivery journeys, comprising:

a storing module that stores address data records in a database of a computer system;

an address module that makes available the address data records with a navigation system having a display screen for displaying navigation information comprising at least two of a street map, a satellite image, and a perspective view of the surroundings of a destination address;

a receiving module that receives at least one piece of additional information on at least one address data record using an input system that is connected to the computer system;

an insertion module that inserts the additional information into the stored address data records using the computer system;

a display module that displays surroundings of the destination address, the display to automatically switch to a perspective view in response to the input system being used to define an approach point;

a selection module that marks a selection area around the destination address on the display screen;

a destination module that displays all other destination addresses in the marked area;

a common approach module that marks a common approach point on a semi-transparent overlay over the navigation information on the display screen for the displayed destination addresses;

an assignment module that assigns a geo-coordinate of the common approach point deviating from the geo-coordinates of the destination addresses in the selection area to all destination addresses in the marked area in a way that, for all destination addresses in the marked area the geo-coordinate of the common approach point is inserted as additional information into the address data records of each of the destination addresses as the approach destination; and a defined approach module that specifies the defined approach point for the destination addresses to courier drivers in the display screen.

* * * * *